United States Patent
Waku et al.

(10) Patent No.: US 8,433,484 B2
(45) Date of Patent: Apr. 30, 2013

(54) OIL PRESSURE CONTROL DEVICE FOR TRANSMISSION AND CONTROL METHOD THEREOF

(75) Inventors: Kousuke Waku, Hadano (JP); Hideshi Wakayama, Hadano (JP); Masayuki Miyazono, Isehara (JP)

(73) Assignee: Jatco Ltd, Fuji-shi (JP)

( * ) Notice: Subject to any disclaimer, the term of this patent is extended or adjusted under 35 U.S.C. 154(b) by 282 days.

(21) Appl. No.: 13/019,673

(22) Filed: Feb. 2, 2011

(65) Prior Publication Data

US 2011/0224879 A1 Sep. 15, 2011

(30) Foreign Application Priority Data

Mar. 9, 2010 (JP) ................................. 2010-052373

(51) Int. Cl.
*F16D 78/06* (2006.01)
(52) U.S. Cl.
USPC .............................................. 701/51; 701/53
(58) Field of Classification Search ............ 701/36, 701/51, 53, 54, 67, 112; 475/117, 123; 192/3.51, 192/3.58; 477/98
See application file for complete search history.

(56) References Cited

U.S. PATENT DOCUMENTS

| | | | |
|---|---|---|---|
| 7,497,800 B2 * | 3/2009 | Sakata et al. | 475/136 |
| 7,779,958 B2 | 8/2010 | Kitano et al. | |
| 8,187,147 B2 * | 5/2012 | Tryon et al. | 477/52 |
| 2006/0120888 A1 | 6/2006 | Kitano et al. | |
| 2007/0179004 A1 | 8/2007 | Endo | |
| 2008/0240941 A1 | 10/2008 | Kumazaki et al. | |

FOREIGN PATENT DOCUMENTS

| | | | |
|---|---|---|---|
| JP | 2006-161838 A | 6/2006 | |
| JP | 2006-283809 A | 10/2006 | |

* cited by examiner

*Primary Examiner* — Richard M. Camby
(74) *Attorney, Agent, or Firm* — Foley & Lardner LLP

(57) ABSTRACT

An oil pressure control device for a transmission engages or disengages a frictional engagement element of the transmission by controlling an oil pressure supplied from a mechanical oil pump driven by a power source for driving a vehicle and an electric oil pump driven by an electric motor, and includes: an air entering determining unit which determines whether or not air enters the electric oil pump; and an air discharging unit which, when an ignition switch of the power source is switched from an ON state to an OFF state after the air entering determining unit has determined that air enters the electric oil pump, drives the electric oil pump such that the air entering the electric oil pump is discharged from the electric oil pump together with an oil.

12 Claims, 7 Drawing Sheets

OIL PRESSURE CONTROL DEVICE FOR TRANSMISSION AND CONTROL METHOD THEREOF

FIELD OF THE INVENTION

This invention relates to an oil pressure control device for a transmission and a control method thereof.

BACKGROUND OF THE INVENTION

A conventional vehicle includes a mechanical oil pump capable of supplying oil when an engine is driven and an electric oil pump capable of supplying oil when the engine is stopped. Hence, when idling stop control, for example, is underway, oil pressure is supplied to a frictional engagement element of a transmission from the electric oil pump.

In this type of vehicle, a delay occurs in a rise of the oil pressure from the electric oil pump when air enters the electric oil pump.

In response to this problem, JP 2006-161838A discloses a device that improves the rise of the oil pressure from the electric oil pump by activating the electric oil pump immediately before idling stop control is performed such that air entering the electric oil pump is agitated and dispersed.

SUMMARY OF THE INVENTION

Even when the invention described above is employed, the oil pressure from the electric oil pump may not rise for a predetermined amount of time if a large amount of air enters the electric oil pump, for example. In such a case, the engine is started so that oil pressure is supplied by the mechanical oil pump.

However, in this case, the air remains in the electric oil pump, and therefore a delay occurs in the rise of the oil pressure from the electric oil pump the next time to the electric oil pump is started.

This invention has been designed to solve this problem, and an object thereof is to advance a rise of oil pressure from an electric oil pump.

A control device for a transmission according to an aspect of this invention engages or disengages a frictional engagement element of the transmission by controlling an oil pressure supplied from a mechanical oil pump driven by a power source for driving a vehicle and an electric oil pump driven by an electric motor. The control device includes an air entering determining unit which determines whether or not air enters the electric oil pump, and an air discharging unit which, when an ignition switch of the power source is switched from an ON state to an OFF state after the air entering determining unit has determined that air enters the electric oil pump, drives the electric oil pump such that the air entering the electric oil pump is discharged from the electric oil pump together with an oil.

A control method according to another aspect of this invention is a method of controlling an oil pressure control device for a transmission that engages or disengages a frictional engagement element of the transmission by controlling an oil pressure supplied from a mechanical oil pump driven by a power source for driving a vehicle and an electric oil pump driven by an electric motor. The method includes determining whether or not air enters the electric oil pump, driving the electric oil pump when an ignition switch of the power source is switched from an ON state to an OFF state after air is determined to enter the electric oil pump, and discharging the air entering the electric oil pump from the electric oil pump together with an oil.

According to these aspects, when the ignition switch is switched OFF in a state where air enters the electric oil pump, the air in the electric oil pump can be discharged from the electric oil pump. As a result, the oil pressure from the electric oil pump can be caused to rise quickly the next time the electric oil pump is activated.

According to this invention, the rise of the oil pressure from the electric oil pump can be advanced.

DESCRIPTION OF THE PREFERRED EMBODIMENTS

Embodiments of this invention will be described below with reference to the attached figures. It should be noted that in the following description, a "gear ratio" of a certain speed change mechanism is a value obtained by dividing an input rotation speed of the speed change mechanism by an output rotation speed of the speed change mechanism. Further, a "Lowest gear ratio" is a maximum gear ratio of the speed change mechanism, and a "Highest gear ratio" is a minimum gear ratio of the speed change mechanism.

Figure 1:
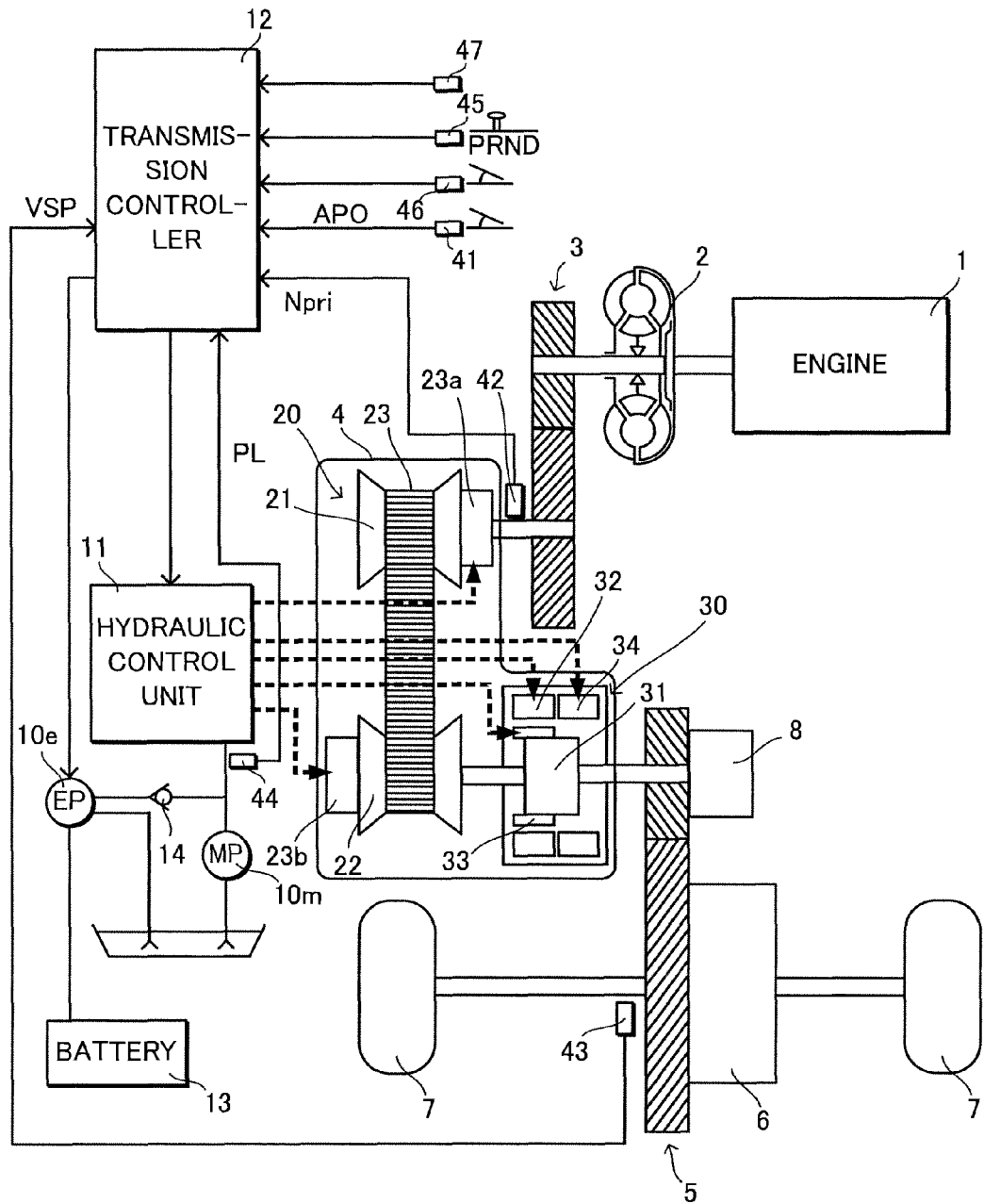
FIG. 1 is a schematic constitutional diagram showing a vehicle according to a first embodiment of this invention.

FIG. 1 is a schematic constitutional diagram showing a vehicle installed with an oil pressure control device according to a first embodiment of this invention. The vehicle includes an engine 1 as a power source. An output rotation of the engine 1 is transmitted to a drive wheel 7 via a torque converter 2 having a lockup clutch, a first gear train 3, a continuously variable transmission (to be referred to simply as a "transmission 4" hereafter), a second gear train 5, and a final reduction gear 6. The second gear train 5 is provided with a parking mechanism 8 that locks an output shaft of the transmission 4 mechanically to be incapable of rotating when the vehicle is parked.

The vehicle is further provided with a mechanical oil pump 10m driven using a part of a power of the engine 1, an electric oil pump 10e driven using an electric motor, a hydraulic control circuit 11 that regulates oil pressure from the mechanical oil pump 10m or the electric oil pump 10e and supplies the regulated oil pressure to respective sites of the transmission 4, and a transmission controller (the oil pressure control device) 12 that controls the hydraulic control circuit 11 and so on.

The electric oil pump 10e is driven by the electric motor, which is driven by a supply of power from a battery 13, to supply oil pressure to the hydraulic control circuit 11. The electric motor is controlled by a motor driver. The electric oil pump 10e supplies the oil pressure to the hydraulic control circuit 11 when oil pressure cannot be supplied by the mechanical oil pump 10m, for example during idling stop control in which the engine 1 is stopped automatically. A check valve 14 is provided in a flow passage through which oil discharged from the electric oil pump 10e flows. Comparing the electric oil pump 10e and the mechanical oil pump 10m, the electric oil pump 10e is smaller than the mechanical oil pump 10m.

The transmission 4 includes a belt continuously variable speed change mechanism (to be referred to hereafter as a "variator 20"), and a sub-transmission mechanism 30 provided in series with the variator 20. Here, "provided in series with" means that the variator 20 and the sub-transmission mechanism 30 are provided in series on a power transmission path extending from the engine 1 to the drive wheel 7. The sub-transmission mechanism 30 may be connected directly to an output shaft of the variator 20, as in this example, or via another speed change/power transmission mechanism (a gear train, for example). Alternatively, the sub-transmission mechanism 30 may be connected to the front (an input shaft side) of the variator 20.

The variator 20 includes a primary pulley 21, a secondary pulley 22, and a V belt 23 wound around the pulleys 21, 22. The pulleys 21, 22 respectively include a fixed conical plate, a movable conical plate that is disposed relative to the fixed conical plate such that respective sheave surfaces thereof face each other and thereby forms a V groove with the fixed conical plate, and a hydraulic cylinder 23a, 23b that is provided on a back surface of the movable conical plate in order to displace the movable conical plate in an axial direction. When oil pressure supplied to the hydraulic cylinders 23a, 23b is adjusted, a width of the V groove varies, causing contact radii between the V belt 23 and the respective pulleys 21, 22 to vary, and as a result, the gear ratio of the variator 20 varies continuously.

The sub-transmission mechanism 30 is a two-forward position/one-reverse position speed change mechanism. The sub-transmission mechanism 30 includes a Ravigneaux planetary gear mechanism 31 formed by coupling carriers of two planetary gears, and a plurality of frictional engagement elements (a Low brake 32, a High clutch 33, and a Rev brake 34) that are connected to a plurality of rotary elements constituting the Ravigneaux planetary gear mechanism 31 in order to modify link states of the rotary elements. By adjusting the oil pressure supplied to the respective frictional engagement elements 32 to 34 in order to modify engagement/disengagement states of the respective frictional engagement elements 32 to 34, a gear position of the sub-transmission mechanism 30 is switched.

For example, when the Low brake 32 is engaged and the High clutch 33 and Rev brake 34 are disengaged, the gear position of the sub-transmission mechanism 30 shifts to a first speed. When the High clutch 33 is engaged and the Low brake 32 and Rev brake 34 are disengaged, the gear position of the sub-transmission mechanism 30 shifts to a second speed having a smaller gear ratio than the first speed. When the Rev brake 34 is engaged and the Low brake 32 and High clutch 33 are disengaged, the gear position of the sub-transmission mechanism 30 shifts to reverse. It should be noted that in the following description, a state in which the gear position of the sub-transmission mechanism 30 is the first speed will be expressed as "the transmission 4 is in a low speed mode", and a state in which the gear position is the second speed will be expressed as "the transmission 4 is in a high speed mode".

Figure 2:
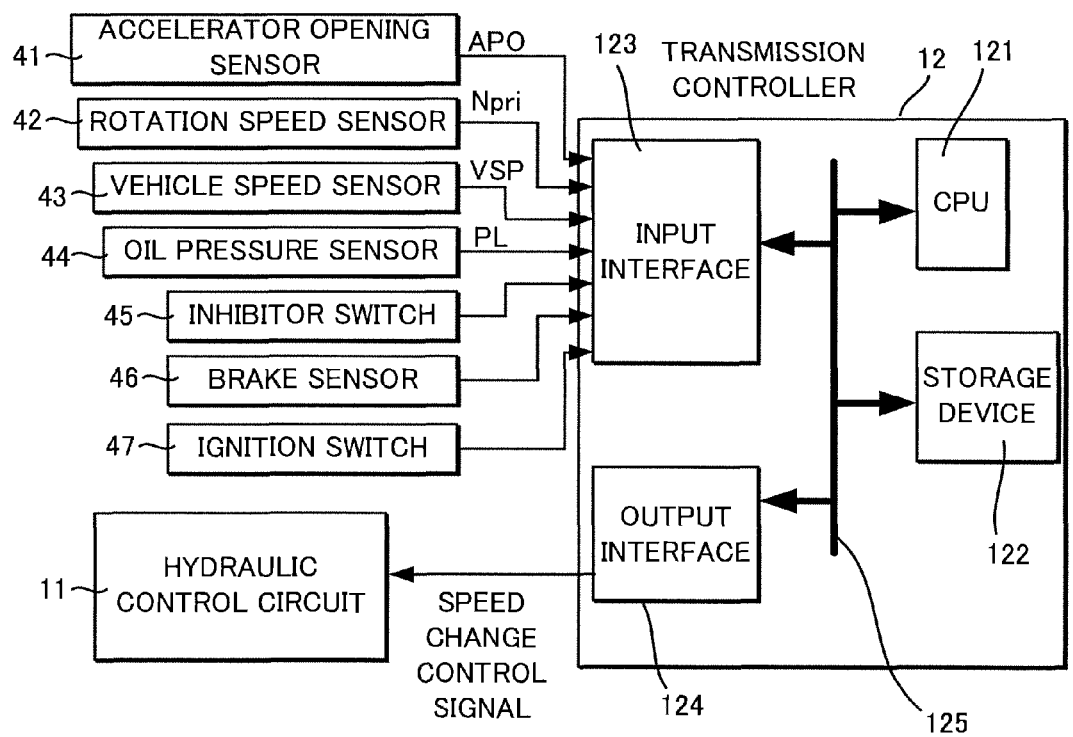
FIG. 2 is a schematic diagram showing an internal constitution of a transmission controller according to the first embodiment of this invention.

As shown in FIG. 2, the transmission controller 12 is constituted by a CPU 121, a storage device 122 having a RAM and a ROM, an input interface 123, an output interface 124, and a bus 125 connecting these components to each other.

An output signal from an accelerator opening sensor 41 that detects an accelerator opening APO, i.e. an accelerator pedal operation amount, an output signal from a rotation speed sensor 42 that detects an input rotation speed of the transmission 4 (=a rotation speed of the primary pulley 21), an output signal from a vehicle speed sensor 43 that detects a vehicle speed VSP, an output signal from an oil pressure sensor 44 that detects the oil pressure supplied to the hydraulic control circuit, an output signal from an inhibitor switch 45 that detects a position of a select lever, an output signal from a brake sensor 46 that detects depression of a foot brake, an output signal from an ignition switch 47 that starts and stops the vehicle, and so on are input into the input interface 123.

A control program (FIG. 3) for controlling the electric oil pump 10e, and so on are stored in the storage device 122. The CPU 121 reads and executes the control program stored in the storage device 122, generates control signals by implementing various types of calculation processing on the various signals input via the input interface 123, and outputs the generated control signals to the hydraulic control circuit 11, the electric oil pump 10e, and so on via the output interface 124. Various values used by the CPU 121 during the calculation processing and corresponding calculation results are stored in the storage device 122 as appropriate.

The hydraulic control circuit 11 is constituted by a plurality of flow passages and a plurality of hydraulic control valves. The hydraulic control circuit 11 switches an oil pressure supply path by controlling the plurality of hydraulic control valves on the basis of a speed change control signal from the transmission controller 12, prepares a required oil pressure from the oil pressure generated by the mechanical oil pump 10m and the electric oil pump 10e, and supplies the prepared oil pressure to respective sites of the transmission 4. As a result, the gear ratio of the variator 20 and the gear position of the sub-transmission mechanism 30 are switched, whereby a speed change is performed in the transmission 4.

When the vehicle is stationary, idling stop control is performed to stop the engine 1 with the aim of improving fuel efficiency. During the idling stop control, a piston stroke of the Low brake 32 in the sub-transmission mechanism 30 is completed in preparation for subsequent vehicle startup. The engine 1 is stopped during idle control. Therefore, oil pressure must be supplied from the electric oil pump 10e to complete the piston stroke of the Low brake 32.

However, when air enters the electric oil pump 10e, a rise of the oil pressure from the electric oil pump 10e is delayed. Hence, in this embodiment, if air enters the electric oil pump 10e, the air is discharged from the electric oil pump 10e when the ignition switch is switched OFF.

Figure 3:
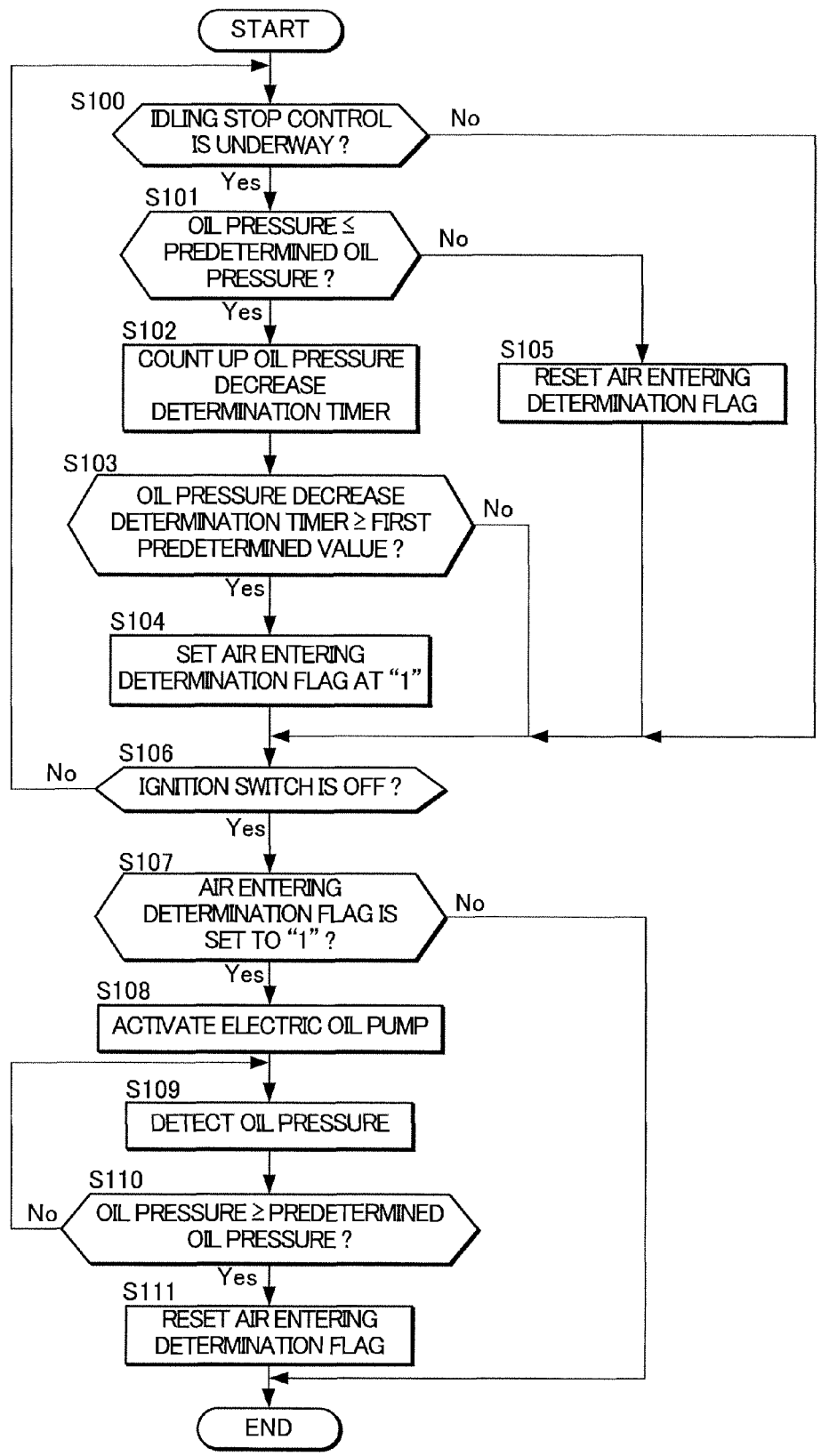
FIG. 3 is a flowchart showing air discharge control executed on an electric oil pump according to the first embodiment of this invention.

Next, air discharge control executed on the electric oil pump 10e will be described using a flowchart shown in FIG. 3.

In a step S100, a determination is made as to whether or not the idling stop control is underway. When the idling stop control is underway, the routine advances to a step S101, and when the idling stop control is not underway, the routine advances to a step S106.

The idling stop control is started when conditions such as the following are satisfied: (1) the accelerator pedal is not depressed; (2) the brake pedal is depressed; (3) the select lever is set at a D range or an N range; and (4) the vehicle is stationary. The idling stop control is stopped, on the other hand, when conditions such as the following are satisfied: (1) the accelerator pedal is depressed; (2) the brake pedal is not depressed; and (3) an air entering determination flag to be described below is set to "1". When the idling stop control is started, a rotation speed of the engine 1 gradually decreases until the rotation speed of the engine 1 eventually reaches zero. It should be noted that the determination as to whether or not to start the idling stop control and the determination as to whether or not to stop the idling stop control may be made using control other than the control described here. In this case, the determination of the step S100 as to whether or not the idling stop control is underway is made on the basis of a result of the other control.

In the step S101, a determination is made as to whether or not the oil pressure supplied to the hydraulic control circuit 11 and detected by the oil pressure sensor 44 is equal to or lower than a predetermined oil pressure.

When the idling stop control is started, the rotation speed of the engine 1 gradually decreases until the engine 1 stops completely, at which point the rotation speed of the engine 1 reaches zero. Further, when the idling stop control is started, the electric oil pump 10e is activated. Accordingly, a discharge pressure of the electric oil pump 10e gradually increases. However, until the rotation speed of the engine 1 falls to a certain rotation speed, a discharge pressure of the mechanical oil pump 10m remains larger than the discharge pressure of the electric oil pump 10e, and therefore the check valve 14 remains closed such that no oil pressure is supplied to the hydraulic control circuit 11 from the electric oil pump 10e. When the discharge pressure of the electric oil pump 10e exceeds the discharge pressure of the mechanical oil pump 10m, the check valve 14 opens, and as a result, oil pressure is supplied to the hydraulic control circuit 11 from the electric oil pump 10e. Hence, when the electric oil pump 10e is operating normally, the oil pressure detected by the oil pressure sensor 44 never falls below the predetermined oil pressure, which is set as the discharge pressure of the electric oil pump 10e.

However, when air enters the electric oil pump 10e, the discharge pressure of the electric oil pump 10e decreases such that the oil pressure detected by the oil pressure sensor 44 falls below the predetermined oil pressure.

Hence, by determining whether or not the discharge pressure of the electric oil pump 10e is lower than the predetermined oil pressure in the step S101, it can be determined whether or not air enters the electric oil pump 10e. In other words, the predetermined oil pressure is an oil pressure that falls when air enters the electric oil pump 10e. When the discharge pressure of the electric oil pump 10e is lower than the predetermined oil pressure, the routine advances to a step S102, and when the discharge pressure of the electric oil pump 10e is equal to or higher than the predetermined oil pressure, the routine advances to a step S105.

In the step S102, an oil pressure decrease determination timer for the electric oil pump 10e is counted up.

In a step S103, the oil pressure decrease determination timer is compared with a first predetermined value. When the oil pressure decrease determination timer is equal to or higher than the first predetermined value, the routine advances to a step S104, and when the oil pressure decrease determination timer is lower than the first predetermined value, the routine advances to the step S106. The first predetermined value is a preset value at which it can be determined accurately that air enters the electric oil pump 10e, leading to a reduction in the discharge pressure of the electric oil pump 10e.

In the step S104, the air entering determination flag is set at "1". As a result, the idling stop control is halted and the electric oil pump 10e is stopped.

When the discharge pressure of the electric oil pump 10e is equal to or higher than the predetermined oil pressure in the step S101, it is determined in the step S105 that the electric oil pump 10e is operating normally. Accordingly, the air entering determination flag is reset, whereupon the routine advances to the step S106. It should be noted that when the air entering determination flag is reset, the value thereof is "0".

In the step S106, a determination is made as to whether or not the ignition switch 47 is OFF. When the ignition switch 47 is OFF, the routine advances to a step S107, and when the ignition switch 47 is not OFF, the routine returns to the step S100, where the control described above is repeated.

In the step S107, a determination is made as to whether or not the air entering determination flag is set to "1". When the air entering determination flag is set to "1", the routine advances to a step S108, and when the air entering determination flag is set to "0", the current control is terminated.

In the step S108, the electric oil pump 10e is activated. When the air entering determination flag is set to "1", air enters the electric oil pump 10e, and therefore the electric oil pump 10e is activated in order to discharge the air entering the electric oil pump 10e from the electric oil pump 10e together with oil. It should be noted that in this embodiment, the electric oil pump 10e is activated at substantially the same time as the ignition switch 47 is switched OFF.

In a step S109, the discharge pressure of the electric oil pump 10e is detected by the oil pressure sensor 44.

In a step S110, a determination is made as to whether or not the oil pressure detected in the step S109 is equal to or higher than the predetermined oil pressure. When the oil pressure detected in the step S109 is equal to or higher than the predetermined oil pressure, it is determined that the oil intermixed with the air has been discharged from the electric oil pump 10e. Hence, when the oil pressure detected by the oil pressure sensor 44 is equal to or higher than the predetermined oil pressure, the routine advances to a step S111, and when the oil pressure detected by the oil pressure sensor 44 is lower than the predetermined oil pressure, the routine returns to the step S109, where the control described above is repeated.

In the step S111, the air entering determination flag is reset. Further, when the electric oil pump 10e is operative, the electric oil pump 10e is stopped. The current control is then terminated.

In this embodiment, the determination as to whether or not the oil intermixed with the air has been discharged from the electric oil pump 10e is made in the step S110 on the basis of the oil pressure detected by the oil pressure sensor 44, but the determination may be made on the basis of an elapsed time from activation of the electric oil pump 10e. In this case, a determination is made as to whether or not a time extending from a state in which no oil is in the electric oil pump 10e to a state in which the electric oil pump 10e is completely filled with oil, or in other words a time required for the oil intermixed with the air to be completely discharged from the electric oil pump 10e, has elapsed.

Figure 4:
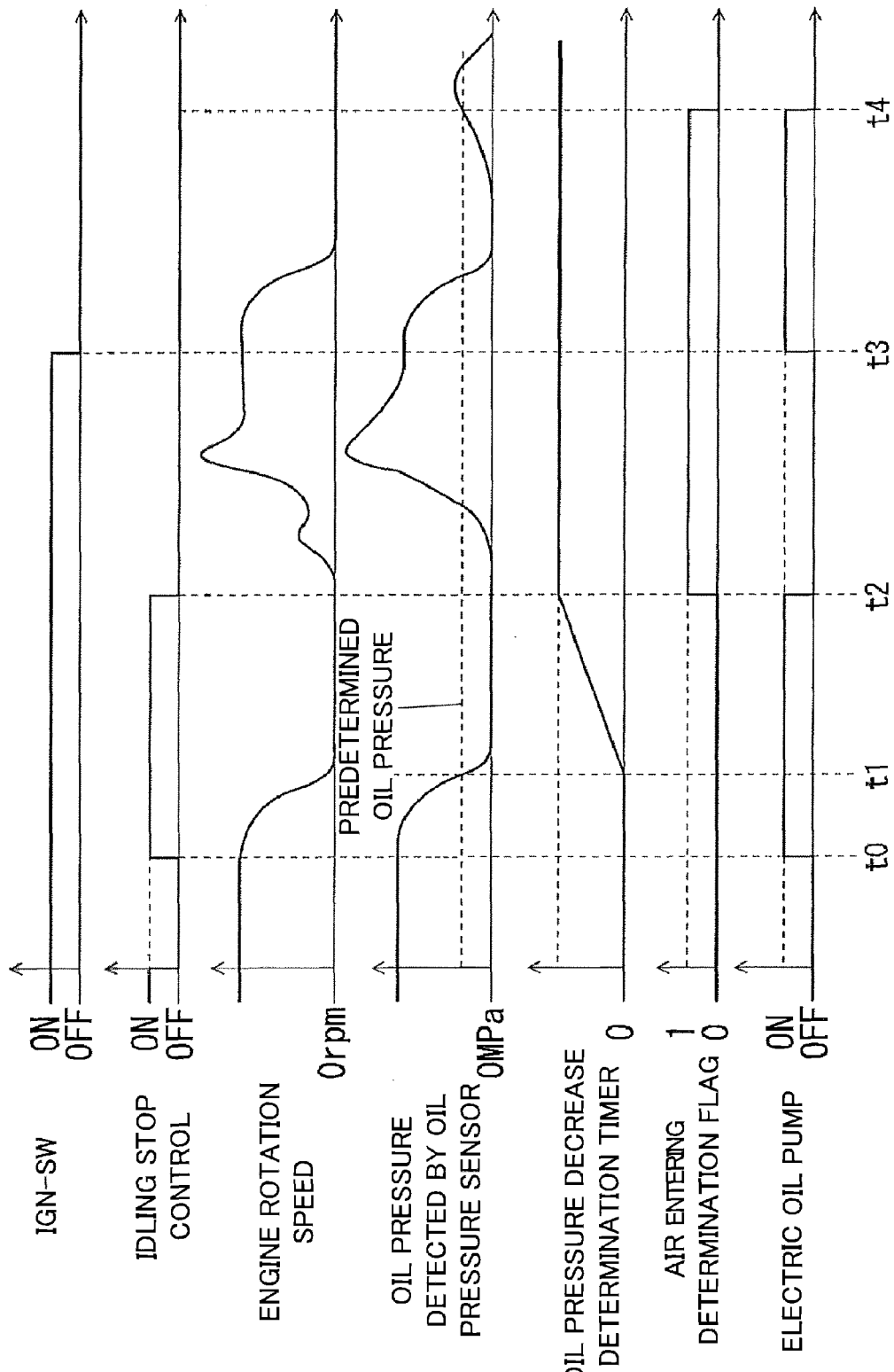
FIG. 4 is a time chart showing a case in which the air discharge control is executed on the electric oil pump according to the first embodiment of this invention.

Next, driving states of the electric oil pump 10e and so on according to this embodiment when the ignition switch 47 (IGN-SW) is switched OFF will be described using a time chart shown in FIG. 4.

When the idling stop conditions are satisfied at a time t0, the idling stop control is started. Accordingly, the rotation speed of the engine 1 decreases, leading to a reduction in the discharge pressure of the mechanical oil pump 10m and a corresponding reduction in the oil pressure detected by the oil pressure sensor 44. Further, the electric oil pump 10e is activated.

When the oil pressure detected by the oil pressure sensor 44 falls to or below the predetermined oil pressure at a time t1, counting up by the oil pressure decrease determination timer begins.

When the oil pressure decrease determination timer reaches the first predetermined value at a time t2, it is determined that air enters the electric oil pump 10e, and the air entering determination flag is therefore set to "1". The electric oil pump 10e is then stopped and the idling stop control is terminated. In this case, the electric oil pump 10e is stopped while air enters the electric oil pump 10e. Further, the engine 1 is started such that oil pressure is supplied to the hydraulic control circuit 11 by the mechanical oil pump 10m.

When the ignition switch 47 is switched OFF at a time t3, the rotation speed of the engine 1 decreases and the electric oil pump 10e is activated. When the discharge pressure of the electric oil pump 10e increases beyond the discharge pressure of the mechanical oil pump 10m, the air is discharged from the electric oil pump 10e together with oil.

When discharge of the air from the electric oil pump 10e is completed at a time t4 such that the oil pressure detected by the oil pressure sensor 44 rises to or above the predetermined oil pressure, the electric oil pump 10e is stopped.

Effects of the first embodiment of this invention will now be described.

When idling stop control is underway, for example, and air enters the electric oil pump 10e such that sufficient oil pressure cannot be supplied to the hydraulic control circuit 11, the idling stop control is terminated and oil pressure is supplied to the hydraulic control circuit 11 by driving the mechanical oil pump 10m. As a result, the frictional engagement elements are set in predetermined engagement states. In this case, however, the air remains into the electric oil pump 10e, and therefore, when oil pressure is next supplied to the hydraulic control circuit 11 by the electric oil pump 10e, the oil pressure from the electric oil pump 10e rises poorly.

When air enters the electric oil pump 10e in this embodiment, the air entering the electric oil pump 10e is discharged from the electric oil pump 10e together with oil by starting the electric oil pump 10e after the ignition switch 47 has been switched OFF. Hence, when the electric oil pump 10e is next activated, a rise characteristic of the oil pressure from the electric oil pump 10e can be improved.

By determining whether or not air enters the electric oil pump 10e during the idling stop control, in which the engine 1 is stopped automatically, it is possible to determine whether or not air enters the electric oil pump 10e without activating the electric oil pump 10e every time the ignition switch 47 is switched OFF. Therefore, an amount of power consumed by the electric oil pump 10e can be reduced.

Activation of the electric oil pump 10e is begun at substantially the same time as the ignition switch 47 is switched OFF, and therefore the air can be discharged from the electric oil pump 10e quickly.

Next, a second embodiment of this invention will be described.

Parts of the second embodiment that differ from the first embodiment will be described.

Figure 5:
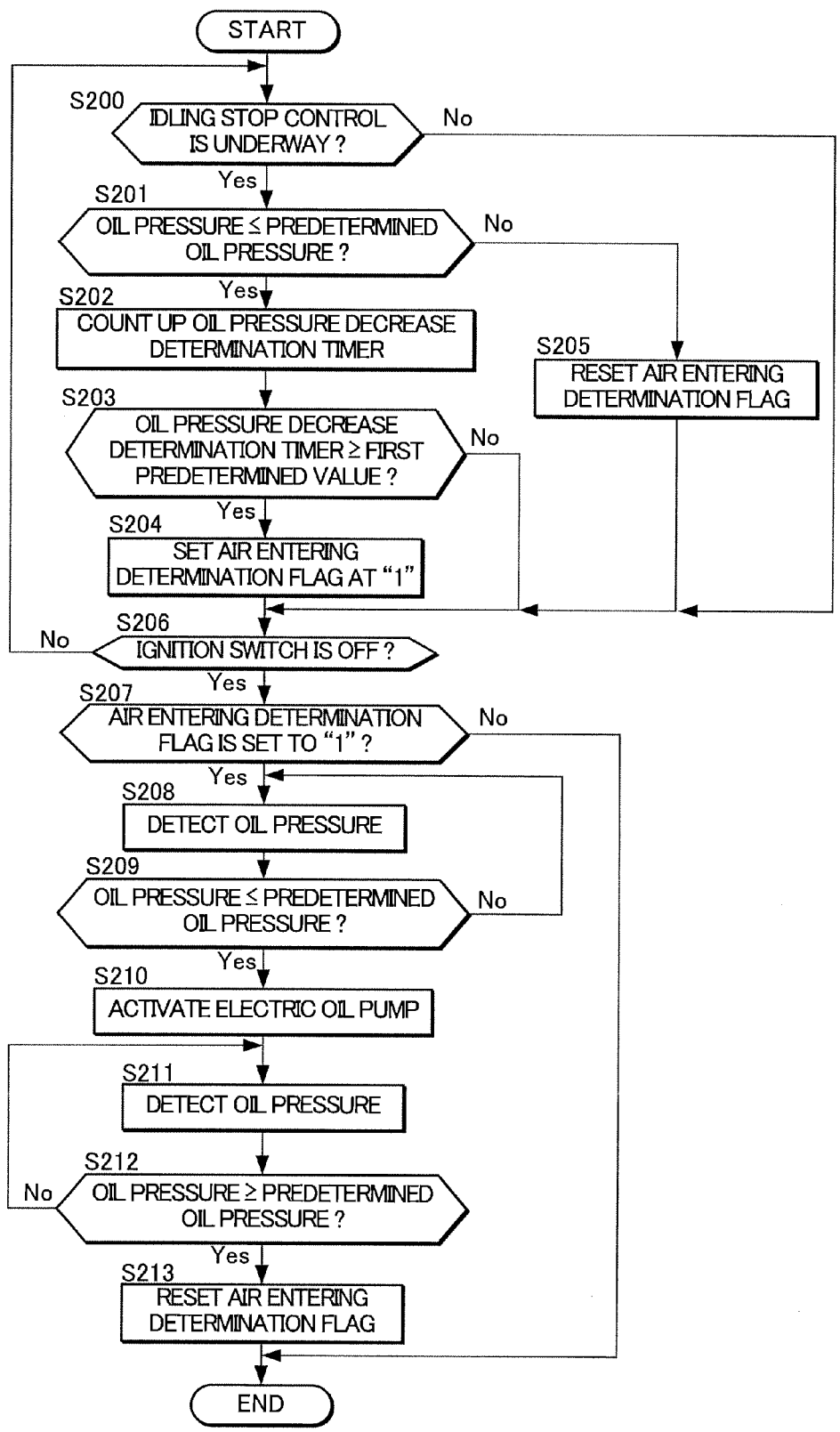
FIG. 5 is a flowchart showing air discharge control executed on an electric oil pump according to a second embodiment of this invention.

This embodiment differs from the first embodiment in the operation performed by the electric oil pump 10e when the ignition switch 47 is switched OFF. Air discharge control executed on the electric oil pump 10e in this embodiment will now be described using a flowchart shown in FIG. 5.

Control executed from a step S200 to a step S207 is identical to that of the first embodiment, and therefore description thereof has been omitted.

In a step S208, the discharge pressure of the mechanical oil pump 10m is detected by the oil pressure sensor 44.

When the oil pressure detected by the oil pressure sensor 44 is equal to or lower than the predetermined oil pressure in a step S209, the routine advances to a step S210, and when the oil pressure detected by the oil pressure sensor 44 is higher than the predetermined oil pressure, the routine returns to the step S208, where the control described above is repeated.

In the step S210, the electric oil pump 10e is activated. When the discharge pressure of the mechanical oil pump 10m is higher than the predetermined oil pressure, the check valve 14 does not open, and therefore oil cannot be discharged from the electric oil pump 10e even if the electric oil pump 10e is activated. Hence, the electric oil pump 10e is started after the discharge pressure of the mechanical oil pump 10m has fallen to or below the predetermined pressure in the steps S209 and S210.

Steps S211 to S213 are identical to the steps S109 to S111 of the first embodiment, and therefore description of the control executed therein has been omitted.

It should be noted that in this embodiment, the electric oil pump 10e is started after the discharge pressure of the mechanical oil pump 10m has fallen to or below the predetermined oil pressure, but the electric oil pump 10e may be activated following the elapse of a predetermined time from the point at which the ignition switch 47 is switched OFF. The predetermined time is a preset time in which it is possible to determine that the discharge pressure of the electric oil pump 10e has increased beyond the discharge pressure of the mechanical oil pump 10m.

Effects of the second embodiment of this invention will now be described.

The electric oil pump 10e is activated when the discharge pressure of the mechanical oil pump 10m has fallen below the discharge pressure of the electric oil pump 10e, and therefore air can be discharged from the electric oil pump 10e accurately.

The electric oil pump 10e is activated after the discharge pressure of the mechanical oil pump 10m has fallen to or below the predetermined oil pressure. In other words, the electric oil pump 10e is not driven while the discharge pressure of the mechanical oil pump 10m is higher than the discharge pressure of the electric oil pump 10e such that oil cannot be discharged from the electric oil pump 10e. As a result, the amount of power consumed by the electric oil pump 10e can be reduced.

A third embodiment of this invention will now be described.

Figure 6:
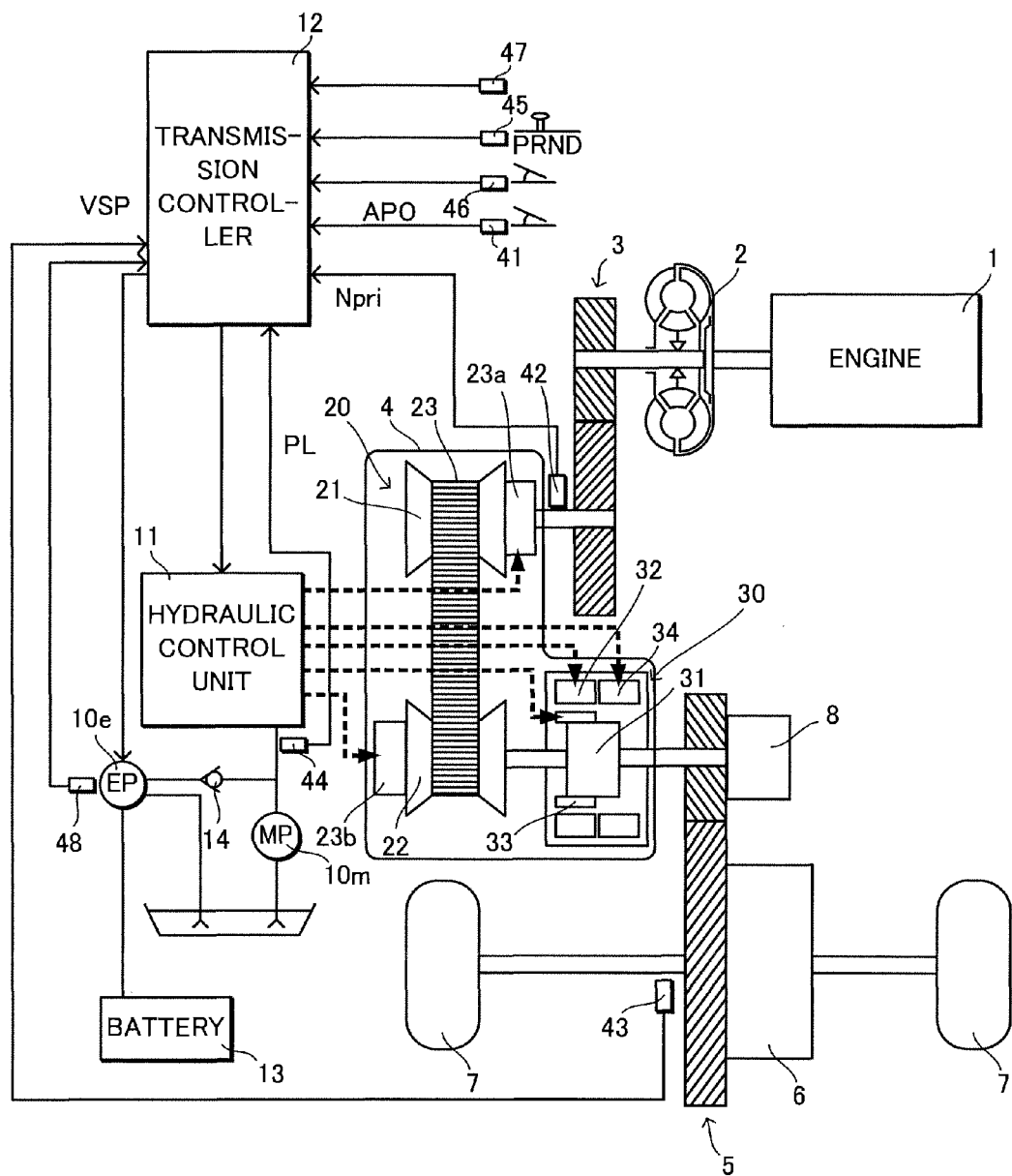
FIG. 6 is a schematic constitutional diagram showing a vehicle according to a third embodiment of this invention.

FIG. 6 is a schematic constitutional diagram of a vehicle according to this embodiment. The vehicle according to this embodiment includes a rotation speed sensor 48 that detects the rotation speed of the electric oil pump 10e.

Figure 7:
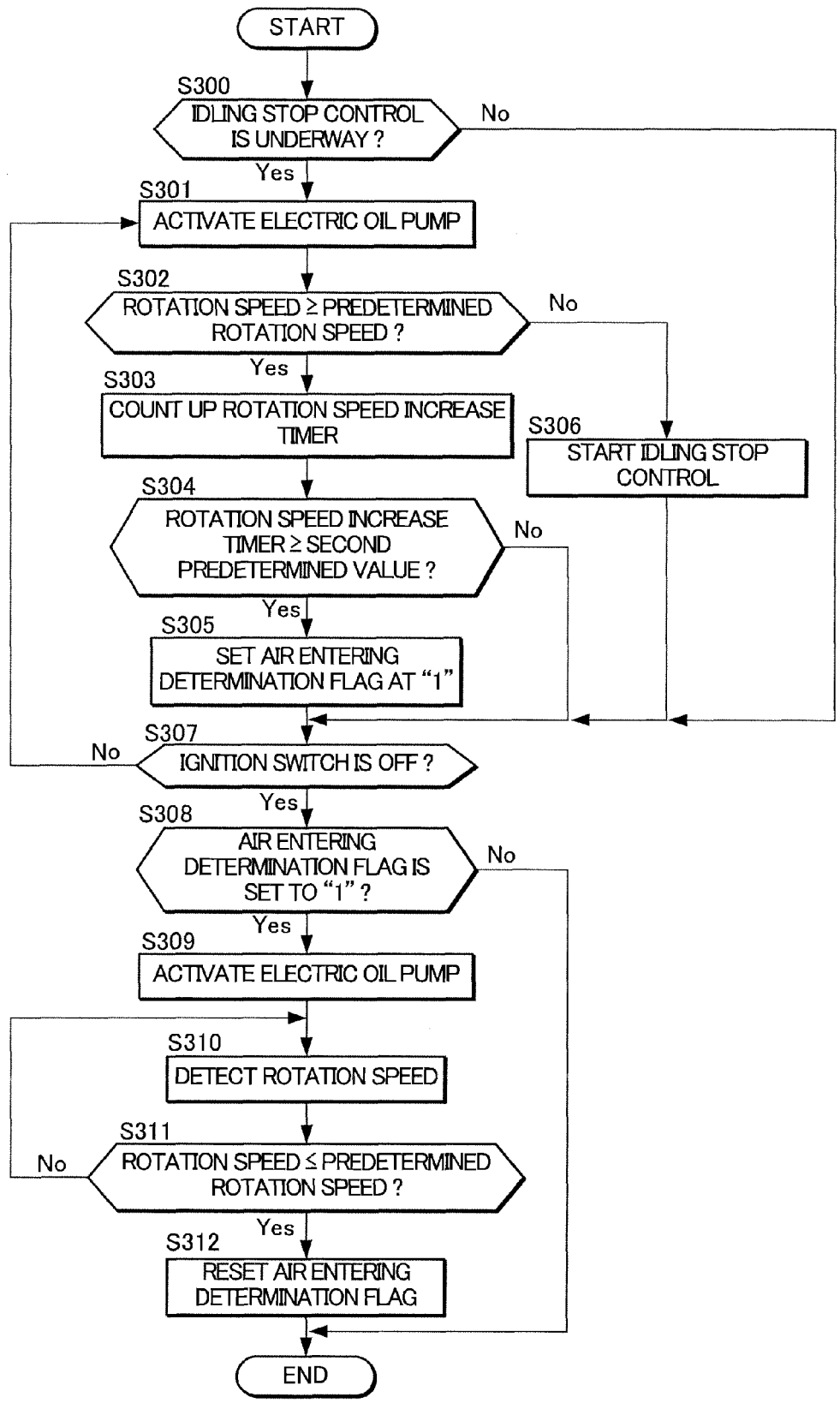
FIG. 7 is a flowchart showing air discharge control executed on an electric oil pump according to the third embodiment of this invention.

Air discharge control executed on the electric oil pump 10e in this embodiment will now be described using a flowchart shown in FIG. 7.

In a step S300, a determination is made as to whether or not preparation for the idling stop control has begun. When it is determined that the preparation for the idling stop control has begun, the routine advances to a step S301, and when it is determined that the preparation for the idling stop control has not yet begun, the routine advances to a step S307.

The preparation for the idling stop control is determined to have begun when conditions such as the following are satisfied: (1) the accelerator pedal is not depressed; (2) the brake pedal is depressed; (3) the select lever is in the D range or the N range; and (4) the vehicle speed is equal to or lower than a predetermined vehicle speed.

In the step S301, the electric oil pump 10e is activated.

In a step S302, the rotation speed of the electric oil pump 10e is detected by the rotation speed sensor 48 and a determination is made as to whether or not the rotation speed of the electric oil pump 10e is equal to or higher than a predetermined rotation speed. When the rotation speed of the electric oil pump 10e is equal to or higher than the predetermined rotation speed, the routine advances to a step S303, and when the rotation speed of the electric oil pump 10e is lower than the predetermined rotation speed, the routine advances to a step S306. The predetermined rotation speed is a preset rotation speed that increases when air enters the electric oil pump 10e.

When air enters the electric oil pump 10e and the electric oil pump 10e is activated before the idling stop control is performed, a driving resistance of the electric oil pump 10e decreases, and therefore the rotation speed of the electric oil pump 10e increases in comparison with a case in which no air enters the electric oil pump 10e.

Hence, when the rotation speed of the electric oil pump 10e is equal to or higher than the predetermined rotation speed, it is determined that air enters the electric oil pump 10e.

In the step S303, a rotation speed increase timer for the electric oil pump 10e is counted up.

In a step S304, a determination is made as to whether or not the rotation speed increase timer for the electric oil pump 10e is equal to or higher than a second predetermined value. When the rotation speed increase timer for the electric oil pump 10e is equal to or higher than the second predetermined value, the routine advances to a step S305, and when the rotation speed increase timer for the electric oil pump 10e is lower than the second predetermined value, the routine advances to the step S306. The second predetermined value is a preset value at which it can be determined accurately that air enters the electric oil pump 10e.

In the step S305, the air entering determination flag is set to "1" and the idling stop control is prohibited. Further, the electric oil pump 10e is stopped.

When the rotation speed of the electric oil pump 10e is determined to be lower than the predetermined rotation speed in the step S302, the idling stop control is started in the step S306. Further, the air entering determination flag is reset.

In the step S307, a determination is made as to whether or not the ignition switch 47 is OFF. When the ignition switch 47 is OFF, the routine advances to a step S308, and when the ignition switch 47 is not OFF, the routine returns to the step S300, where the control described above is repeated.

In the step S308, a determination is made as to whether or not the air entering determination flag is set to "1". When the air entering determination flag is set to "1", the routine advances to a step S309, and when the air entering determination flag is set to "0", the current control is terminated.

In the step S309, the electric oil pump 10e is started.

In a step S310, the rotation speed of the electric oil pump 10e is detected by the rotation speed sensor 48.

In a step S311, a determination is made as to whether or not the rotation speed of the electric oil pump 10e is equal to or lower than the predetermined rotation speed. When the rotation speed of the electric oil pump 10e is equal to or lower than the predetermined rotation speed, the routine advances to a step S312, and when the rotation speed of the electric oil pump 10e is higher than the predetermined rotation speed, the routine returns to the step S310, where the control described above is repeated.

In the step S312, the air entering determination flag is reset. Further, when the electric oil pump 10e is operative, the electric oil pump 10e is stopped. The current control is then terminated.

It should be noted that in this embodiment, the rotation speed of the electric oil pump 10e is detected, but a current flowing to the electric oil pump 10e may be detected. In this case, when air enters the electric oil pump 10e, the electric oil pump 10e rotates in a substantially unloaded condition, and therefore the current decreases. Hence, by detecting this reduction in the current, it is possible to determine that air enters the electric oil pump 10e.

Further, in this embodiment, the electric oil pump 10e is activated in order to determine whether or not air enters the electric oil pump 10e only when preparation for the idling stop control is underway. However, this embodiment is not limited thereto, and for example, the electric oil pump 10e may be activated in order to determine whether or not air enters the electric oil pump 10e during the idling stop control. In so doing, it becomes possible to determine whether or not air enters the electric oil pump 10e even in a case where the idling stop control is started such that the ignition switch 47 is switched OFF before the discharge pressure of the mechanical oil pump 10m falls below the discharge pressure of the electric oil pump 10e, for example, and as a result, the air entering the electric oil pump 10e can be discharged reliably.

Effects of the third embodiment of this invention will now be described.

The rotation speed of the electric oil pump 10e is detected by the rotation speed sensor 48, and the determination as to whether or not air enters the electric oil pump 10e is made on the basis of the rotation speed of the electric oil pump 10e. It is therefore possible to determine that air enters the electric oil pump 10e even when the discharge pressure from the electric oil pump 10e is smaller than the discharge pressure from the mechanical oil pump 10m.

This invention is not limited to the embodiments described above and may be subjected to various modifications and amendments without the scope of the technical spirit thereof.

This application claims priority from Japanese Patent Application No. 2010-52373, filed Mar. 9, 2010, which is incorporated herein by reference in its entirety.

What is claimed is:

1. An oil pressure control device for a transmission, which engages or disengages a frictional engagement element of the transmission by controlling an oil pressure supplied from a mechanical oil pump driven by a power source for driving a vehicle and an electric oil pump driven by an electric motor, comprising:
   an air entering determining unit which determines whether or not air enters the electric oil pump; and
   an air discharging unit which, when an ignition switch of the power source is switched from an ON state to an OFF state after the air entering determining unit has determined that air enters the electric oil pump, drives the electric oil pump such that the air entering the electric oil pump is discharged from the electric oil pump together with an oil.

2. The oil pressure control device for the transmission as defined in claim 1, wherein the air entering determining unit determines whether or not air enters the electric oil pump when the power source is automatically stopped.

3. The oil pressure control device for the transmission as defined in claim 1, wherein the air discharging unit starts the electric oil pump at the same time as the ignition switch is switched to the OFF state.

4. The oil pressure control device for the transmission as defined in claim 1, wherein the air discharging unit starts the electric oil pump when a discharge pressure of the electric oil pump increases beyond a discharge pressure of the mechanical oil pump.

5. A method of controlling an oil pressure control device for a transmission, which engages or disengages a frictional engagement element of the transmission by controlling an oil pressure supplied from a mechanical oil pump driven by a power source for driving a vehicle and an electric oil pump driven by an electric motor, comprising:
- determining whether or not air enters the electric oil pump;
- driving the electric oil pump when an ignition switch of the power source is switched from an ON state to an OFF state after air is determined to enter the electric oil pump; and
- discharging the air entering the electric oil pump from the electric oil pump together with an oil.

6. The method of controlling the oil pressure control device for the transmission as defined in claim 5, wherein the determining is performed when the power source is automatically stopped.

7. The method of controlling the oil pressure control device for the transmission as defined in claim 5, wherein the driving the electric oil pump is started at the same time as the ignition switch is switched to the OFF state.

8. The method of controlling the oil pressure control device for the transmission as defined in claim 5, wherein the driving the electric oil pump is started when a discharge pressure of the electric oil pump increases beyond a discharge pressure of the mechanical oil pump.

9. An oil pressure control device for a transmission, which engages or disengages a frictional engagement element of the transmission by controlling an oil pressure supplied from a mechanical oil pump driven by a power source for driving a vehicle and an electric oil pump driven by an electric motor, comprising:
- air entering determining means for determining whether or not air enters the electric oil pump; and
- air discharging means for driving the electric oil pump such that the air entering the electric oil pump is discharged from the electric oil pump together with an oil, when an ignition switch of the power source is switched from an ON state to an OFF state after the air entering determining means has determined that air enters the electric oil pump.

10. The oil pressure control device for the transmission as defined in claim 9, wherein the air entering determining means determines whether or not air enters the electric oil pump when the power source is automatically stopped.

11. The oil pressure control device for the transmission as defined in claim 9, wherein the air discharging means starts the electric oil pump at the same time as the ignition switch is switched to the OFF state.

12. The oil pressure control device for the transmission as defined in claim 9, wherein the air discharging means starts the electric oil pump when a discharge pressure of the electric oil pump increases beyond a discharge pressure of the mechanical oil pump.

* * * * *